C. E. BERKEY.
BATTERY CONNECTION.
APPLICATION FILED AUG. 11, 1914.
1,202,020.
Patented Oct. 24, 1916.
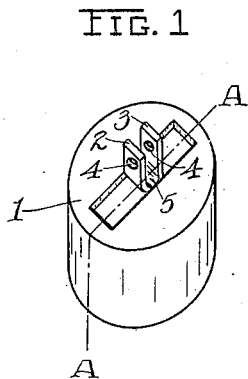
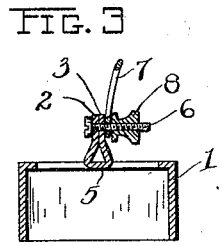
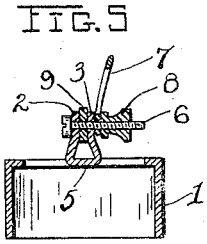
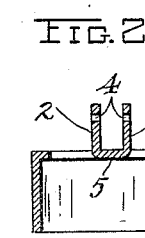
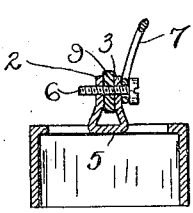
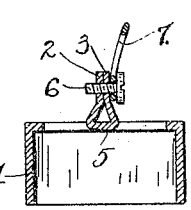
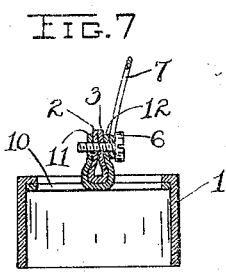
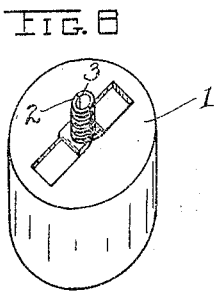
WITNESSES:
H. G. Grover
J. B. Hyde
INVENTOR.
CHARLES E. BERKEY
BY Ira J. Adams
ATTORNEY

UNITED STATES PATENT OFFICE.

CHARLES E. BERKEY, OF CLEVELAND, OHIO, ASSIGNOR TO NATIONAL CARBON COMPANY, A CORPORATION OF NEW JERSEY.

BATTERY CONNECTION.

1,202,020.     Specification of Letters Patent.     Patented Oct. 24, 1916.

Application filed August 11, 1914. Serial No. 856,236.

*To all whom it may concern:*

Be it known that I, CHARLES E. BERKEY, a citizen of the United States, residing at Cleveland, in the county of Cuyahoga and State of Ohio, have invented a certain new and useful Improvement in Battery Connections, of which the following is a full, clear, and exact description.

My invention relates to battery connections and more specifically to metal caps for attaching to dry cell electrodes.

The most frequently used connection for dry cell electrodes consists of a metal cap with some form of binding post attached to the top. Such binding posts are usually secured to the cap by means of solder or rivets and this requires a special operation and frequently results in a loose or insecure connection.

My invention aims to eliminate the soldering or riveting operation by forming the binding post from the cap itself.

Referring to the drawings:—Figure 1 is a perspective view of the electrode cap. Fig. 2 is a section on the line A—A of Fig. 1. Fig. 3 is a section of the cap and complete connection. Figs. 4, 5, and 6 are sections showing different ways of completing the connections with the cap shown in Fig. 1. Fig. 7 is a modification of the connection shown in Fig. 6. Fig. 8 shows a connection having a screw 6 formed from the cap.

The cap 1 is drawn from metal, such as sheet brass, in the usual shape and ears 2 and 3 are punched from the top at the same or a subsequent operation. These ears are pierced by holes 4 and are integral with the cap at 5. The holes are preferably punched at the time the cap is drawn, although they may be made otherwise. After forming the ears, the connection may be completed in various ways. For instance, in Fig. 3 a screw 6 is secured in the hole and the wire 7 may be clamped against the ears by a nut 8. In Figs. 4 and 5 a screw is threaded through both ears and a nut 9. The clamping nut 8 may be used as in Fig. 5 or it may be omitted as in Fig. 4. In the latter, the clamping of the conductor 7 is obtained by the aid of a screw driver. The connection in Figs. 4 and 5 would be used with thin metal as in such cases the ears would not make a strong enough thread for the screw 6. In Fig. 6 the nut 8 is omitted and the conductor is clamped against the ears, though obviously it may be clamped between the ears.

In Fig. 7, a reinforcing disk 10 is inserted in the top of the cap and a second set of ears 11 and 12 are formed from it in the same manner as ears 2 and 3 and simultaneously therewith. The increased thickness of the double set of ears provides more surface for the threads of the screw 6 and thus permits the use of thin sheet metal for the cap.

In any or all of the various forms of completing the connection the holes 4 may be drawn to form projections in any known way instead of being cleanly cut in the ears. This will provide additional surface for the screw threads which may be cut in any or all of the holes in the different modifications.

In Fig. 8 the projections 2 and 3 punched from the top of the cap are squeezed together to form a cylindrical projection which is threaded in any way to receive a clamping nut (not shown). The wire connection will be clamped between the cap and the nut in the usual way.

A battery terminal made in the way described is cheaply formed and inasmuch as it is integral with the cap the resistance is practically *nil*. Rough usage cannot loosen the connection as in soldered or riveted clips and for this reason alone my improved connection is preferable to known forms.

Various other advantages will suggest themselves to one skilled in the art.

Having described my invention, what I claim is:

1. A battery electrode cap having a depending skirt and a top, a projection punched from said top and a screw coöperating therewith adapted to clamp a conductor against said projection.

2. A battery electrode cap having a depending skirt and a top, two ears punched from said top and a screw adapted to clamp a conductor against said ears.

3. A battery electrode cap having a depending skirt and a top, two ears punched from said top to extend substantially at right angles thereto and a screw adapted to clamp a conductor against said ears.

4. A battery electrode cap having a depending skirt and a top, two ears punched from said top having co-lineal openings therein adapted to receive a screw, and a nut on said screw adapted to clamp a conductor.

5. A battery electrode cap having a depending skirt and top, two spaced ears punched from said top to extend substantially at right angles thereto, said ears having co-lineal openings therein adapted to receive a screw, a nut coöperating with said screw to secure it on said ears and a second nut adapted to clamp a conductor on the screw.

In testimony whereof, I hereunto affix my signature in the presence of two witnesses.

CHARLES E. BERKEY.

Witnesses:
L. O. BROOKS,
H. G. GROVER.